July 27, 1965  H. R. KILLIAN  3,197,174
RESILIENT ADJUSTABLE VALVE SEAT FOR BUTTERFLY VALVES
Filed Dec. 4, 1961
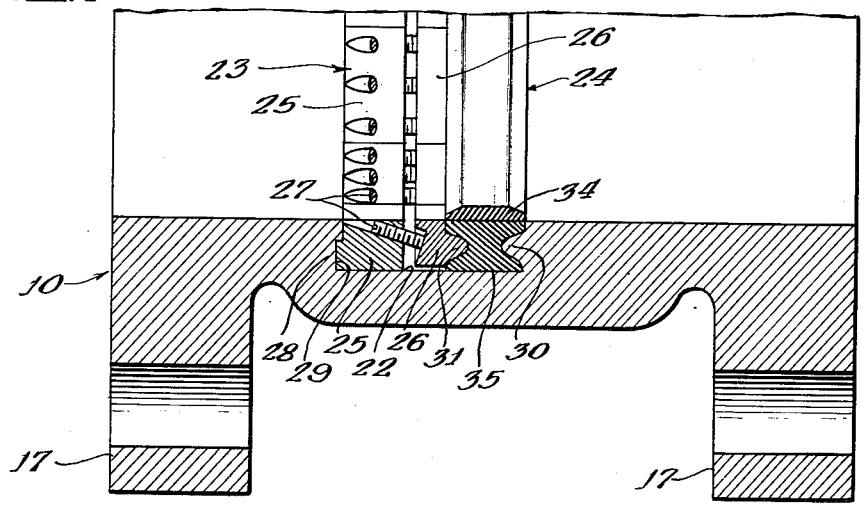
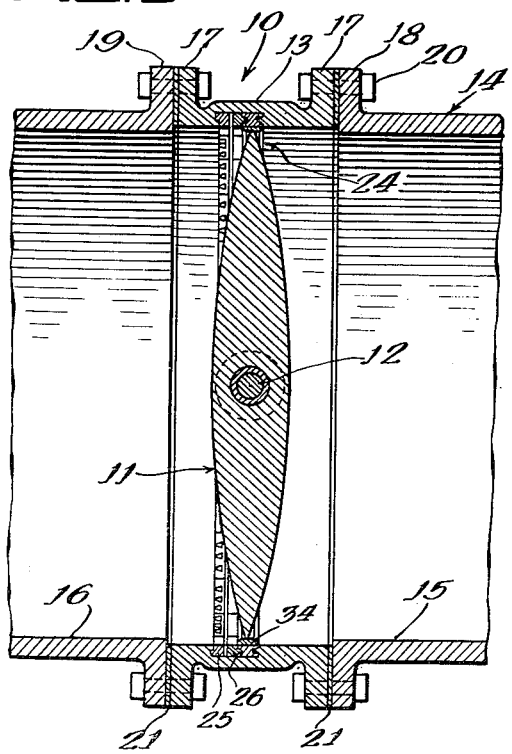
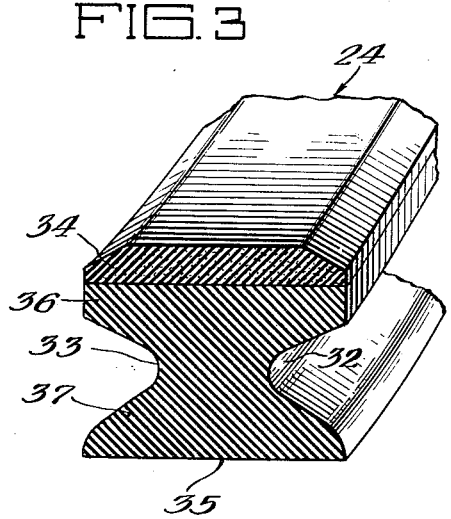
Inventor:
Henry R. Killian
By: Hofgren, Brady, Wegner,
Allen & Stellman
Attorneys

United States Patent Office 3,197,174
Patented July 27, 1965

3,197,174
RESILIENT ADJUSTABLE VALVE SEAT FOR
BUTTERFLY VALVES
Henry R. Killian, Chicago, Ill., assignor to Henry Pratt
Company, a corporation of Illinois
Filed Dec. 4, 1961, Ser. No. 156,717
8 Claims. (Cl. 251—307)

This invention relates to butterfly valves and more particularly to valve seats for use in butterfly valves.

Butterfly valves are commonly used in large diameter conduits such as water mains and the like. Heretofore, a relatively great deal of effort and expense was necessary to produce such a valve which had an accurate fit between the peripheral edge of the valve disc and the sealing surface of the valve seat. Firstly, it was extremely difficult to manufacture such large valve bodies to close tolerances and, secondly, the valve seats themselves, generally being rubber extrusions, possessed portions of different diameters. Therefore, such seats for butterfly valves were usually hand fitted, an expensive method of production, with the result that butterfly valves could not be priced competitively with other types of valves such as gate valves.

An improved valve seat for use in such butterfly valves has now been developed, and is disclosed in Fawkes application No. 720,307, filed March 10, 1958, and assigned to the assignee hereof. As disclosed herein, the seat is received in an annular groove in the valve body and is retained by a novel retaining means therein. The retaining means comprises a plurality of segmental rings which are annularly positioned in the groove and are laterally adjustable therein. The valve seat is maintained in the groove between one wall of the groove and the laterally adjustable retaining means. It has been found that such a valve seat must be relatively hard in order to accept the lateral pressure from the retaining means without causing undesirable deformation of the basic configuration of the seat.

The use of a valve seat comprises of a resilient material of high durometer rating requires a substantial force to seat the valve disc thereon, requiring large, and thereby, expensive valve operators. In valves adapted for use with pressures above approximately 50 to 75 p.s.i., the entire valve seat should be hard in order to eliminate rubber flow which would result in leakage. At low pressure, however, a soft rubber seat would suffice and would provide the desirable lower shaft torque requirement to seat the valve. Such seats of soft rubber would, however, as discussed above, tend to be forced out of position by the retaining means.

The principal object of this invention is to provide a new and improved valve seat for use in a butterfly valve which avoids the above discussed problems.

Another object is to provide such a valve seat structure comprising a unitary body having portions of different hardness.

A further object of this invention is to provide such a valve seat structure wherein the radially inner portion of the valve seat is relatively soft and the remaining portion thereof is relatively hard.

Still another object is to provide such a valve seat structure having a first hard portion adapted to be retained in the valve body and a second soft portion arranged for improved sealing contact with the valve disc.

A yet further object is to provide a butterfly valve having an annular seat with a first portion of hard material adapted to be disposed in the valve body and a second portion of soft material arranged for improved sealing contact with the valve disc, and adjustable retaining means acting on the first portion of said valve seat to clamp said seat in said valve body.

Other objects, features and advantages of the present invention will be apparent from the following description of the preferred embodiment illustrated in the accompanying drawings, in which:

FIG. 1 is a fragmentary longitudinal sectional view of a valve embodying the invention;

FIG. 2 is a diametric sectional view of a conduit provided with a butterfly valve embodying the invention;

FIG. 3 is a fragmentary isometric view of a section of a valve seat embodying the invention.

In the preferred embodiment of this invention, as shown in FIGS. 1 and 2, a butterfly valve 10 includes a valve disc 11 which is on a shaft 12 for rotation about an axis in a valve body 13 perpendicular to the line of flow for controlling the flow of fluid through a conduit 14 in which the valve 13 may be installed. The conduit 14 includes two portions, 15 and 16, between which the valve body 13 is secured. The body 13 may possess flanges generally indicated at 17 for cooperating with the flanges 18 and 19 of conduit portions 15 and 16, respectively, to receive bolts 20 for securing the body 13 to the conduit portions 15 and 16. Gaskets 21 are provided between the flanges to provide a liquid tight seal.

An annular groove 22 is formed in the interior of the valve body 13 for receiving a retaining means 23 and an annular seat, or sealing ring, 24. The retaining means 23 includes a pair of spaced segmental rings made up of individual arcuate segments 25 in the outer ring and segments 26 in the inner ring. Adjustable bolts 27 are threadably engaged in the segments 25 in abutting relation to segments 26 for urging the inner ring toward a convex side wall 30 of the groove 22 in the valve housing. The groove 22 has an opposite side wall 28 which is undercut to cooperate with a protruding portion 29 of the ring segments 25, to retain the segments 26 in the groove.

The valve seat 24 comprises a ring of resilient material, such as rubber or the like. The seat material has a sectional shape clearly observable from either FIGURE 1 or 3 and extends in arcuate form from one hub to the opposite hub where the shaft 12 extends into the valve housing. A continuation of the sealing ring around the hub of the valve shaft forms a continuous seal throughout 360° of the valve closure or disc. Seat 24, in section, includes opposite concave areas 32 and 33 for cooperation respectively with side wall 30 of the groove 20 and a corresponding convex side wall 31 of the ring segments 26. Turning the threadable bolts 27 may cause a lateral adjustment of the ring segments 26 in the groove in the valve housing and, as the space between the segments 26 and ring segments 25 is increased, surface 31 of the ring 26 is urged against surface 33 of the sealing ring 24 which, in turn, causes surface 32 of the ring 24 to be urged against surface 30 of the annular groove 22. By the cooperation of these complementary surfaces the ring 24 is effectively positively clamped in the groove 22.

The seat 24 includes portions 34 and 35 of different hardness. These may be provided, for example, by selectively treating a unitary mass of rubber so as to produce the two portions of different hardness, or by bonding a soft rubber layer, such as a gum rubber layer, onto a hard rubber base such as a synthetic or natural rubber base. Illustratively, the soft portion of the seat may have a durometer rating of approximately 35–40 and the hard portion of the seat may have a durometer rating of approximately 60–70. In the embodiment of this invention, as discussed above, the seat 24 is substantially anvil shaped in cross section. The portion of the seat above the concave areas 32 and 33 is composed of an upper section 34 of soft resilient material and a lower section 36 of a relatively hard resilient material. The section 34, illustratively, may have a thickness of approximately ½" to ¼". The portion 37 below surfaces 32 and 33 is composed of hard resilient material. Thus portion 37 may accept the substantial lateral pressures exerted by the ring 26 while retaining its shape in the groove. As the seating section 34 of the seat is carried on a hard support 36, distortion caused by frictional engagement thereof by the periphery of the valve disc 11 is effectively minimized.

Less shaft torque is necessary to seat a valve disc on a valve seat having a soft resilient inner surface. Therefore, smaller shaft operators may be used, resulting in a less expensive valve unit. By forming the remainder of the valve seat of a hard resilient material, the soft material is given a firm base and the lower portion of the valve seat maintains substantially its basic configuration while being secured by the retaining means. Thus a less expensive valve seat can be used in a valve having a less expensive operator, resulting in a two-fold economic gain. In this invention, the edge of the disc is rounded and of smaller area than the area of the seat over which it sweeps into seating position. The softer material 34 is provided with sloping edges as illustrated in FIGURE 3 to aid the riding of the disc edge onto the seat material. The relative softness of the seat determines, to a degree, the amount of force required to close the valve. At the same time, the seat material is desired to have sufficient body and shape retention to remain in sealing relation with the edge of the disc closed thereupon.

The original manufacture of a butterfly valve as shown herein allows the placement of the resilient seat in the body groove out of contact with the disc edge. With the disc closed, the segments 26 are adjusted to squeeze the harder rubber body in the groove obtaining the proper indentation of the softer rubber portion about the edge of the disc. On pressure tests, additional adjustment may be made as found necessary to insure tightness.

The foregoing detailed description has been given for the clearness of understanding only and no unnecessary limitations should be understood therefrom for some modifications will be obvious to those skilled in the art.

I claim:

1. A butterfly valve comprising a body having a groove therein, a valve seat disposed in said groove, a valve disc pivotally mounted in said body, said seat including a ring being entirely of rubber-like material and having an outer portion of relatively hard material and an inner portion of relatively soft material, said outer portion being shaped to be disposed in said groove and said inner portion being carried by said outer portion to have sealing engagement with said valve disc having a periphery selectively engaged therewith, said soft material being indented by the valve disc for sealing purposes in the closed position of said disc while being held in position by said hard material, and adjustable means for retaining the ring in said groove including a member carried by the valve body and engaging the hard portion of said ring member.

2. A butterfly valve comprising a body having a groove therein, a valve disc pivotally mounted in said body, said seat including a ring in said groove of rubber-like material being substantially anvil-shaped in cross section having an outer portion of hard material and an inner portion of soft material, said outer portion being adapted to be disposed and clamped in said valve body groove and said inner portion being adapted to have sealing engagement with the valve disc having a periphery selectively engageable therewith, said soft material being indented by the valve disc for sealing purposes in the closed position of said disc while being held in position by said hard material, and adjustable means for retaining the ring member in the groove including a member carried by the valve body and engaging the outer hard portion of said ring.

3. A butterfly valve, comprising: a body having an annular groove; an annular seat composed entirely of rubber-like material and having a cross section including a mid-portion of reduced thickness, a top portion above said mid-portion extending into the flow passage of said valve and having an upper section of soft material and a rigid base therefor including a lower section of hard material, and a bottom portion of hard material below said mid-portion; means in said groove for retaining said seat in said groove comprising spaced ring members laterally adjustable relative to said groove by means of an adjustable bolt threadably engaging one member and in abutting relation with the second member, said second member shaped to conform with said mid-portion of said seat, whereby one of said rings and said bottom portion of said seat cooperate to maintain said seat in said groove by the application of pressure thereon; and a valve disc having a periphery selectively engageable with said upper section of the top portion of said seat to seat thereagainst.

4. A butterfly valve as specified to claim 3 in which said upper section of soft material is of rubber-like material having a durometer rating of about 35 to 40 and said bottom portion of hard material is of rubber-like material having a durometer rating of about 60 to 70.

5. A butterfly valve, comprising: a body having an annular groove; a ring-like annular seat having a first outer portion of relatively hard resilient rubber-like material and a second softer inner portion of said material, said seat positioned in said body with said first outer portion in said groove; means for retaining said ring in said groove including a member in the valve body engaging the outer portion of the ring; and a valve disc having a peripheral extent slightly larger than the interior of said ring and said disc mounted in said body within the plane of the seat on an axis approximating a diameter of said seat so that as the valve disc is turned on its axis between positions of opening and closure with respect to the valve body, successive segments of the softer inner portion of the seat will be subjected to the torsional force of the periphery of the disc and will successively engage in sealing relation therewith or be released from said sealing engagement as the peripheral edge of the disc wipes across the face of the ring-like soft portion of the seat.

6. The butterfly valve of claim 5 wherein said seat comprises two portions of resilient material which are bonded together.

7. The butterfly valve of claim 5 wherein said seat is composed of a single mass of resilient material having two portions of different hardness.

8. The butterfly valve of claim 5 wherein the second inner portion of the seat extends into the flow passage of the valve body.

References Cited by the Examiner

UNITED STATES PATENTS

| 1,579,140 | 3/26 | Phillips | 137—434 |
| 1,682,075 | 8/28 | Foulds | 251—307 |
| 1,858,470 | 5/32 | Sloan | 251—21 |
| 1,977,351 | 10/34 | Phillips | 251—306 |
| 2,132,894 | 10/38 | Esnard | 251—86 |

FOREIGN PATENTS

| 1,011,683 | 7/57 | Germany. |

ISADOR WEIL, *Primary Examiner.*